United States Patent [19]

Nakamura et al.

[11] Patent Number: 5,676,713

[45] Date of Patent: Oct. 14, 1997

[54] METHOD OF FUEL GASIFICATION AND AN APPARATUS FOR PERFORMING SUCH A METHOD

[75] Inventors: Shozo Nakamura, Hitachioota; Yasuaki Akatsu, Hitachi; Zensuke Tamura, Tokyo; Toru Kobashi, Kure; Toshihiko Sasaki, Hitachi, all of Japan

[73] Assignees: Hitachi, Ltd.; Babcock-Hitachi Kabushiki Kaisha, both of Tokyo, Japan

[21] Appl. No.: 635,285

[22] Filed: Apr. 19, 1996

Related U.S. Application Data

[63] Continuation of Ser. No. 313,842, Sep. 28, 1994, abandoned.

[30] Foreign Application Priority Data

Sep. 28, 1993 [JP] Japan ................... 5-241362

[51] Int. Cl.$^6$ .......................................... C10J 3/84
[52] U.S. Cl. ................... 48/210; 48/77; 48/197 R; 48/DIG. 2; 122/390; 122/451
[58] Field of Search ................. 48/67, 77, 84, 48/95, 96, 197 R, 210, DIG. 2; 122/7 R, 379, 390, 382, 392, 395, 451

[56] References Cited

U.S. PATENT DOCUMENTS

| Re. 17,506 | 11/1929 | Altimari et al. | 122/395 |
|---|---|---|---|
| 482,848 | 9/1892 | Landis | 122/390 |
| 1,423,759 | 7/1922 | Doble | 122/451 R |
| 1,501,646 | 7/1924 | Brown | 165/84 |
| 1,548,781 | 8/1925 | Jones | 165/84 |
| 1,649,342 | 11/1927 | Fenno | 122/451 R |
| 1,840,834 | 1/1932 | Davis | 165/84 |
| 2,028,504 | 1/1936 | Egloff | 122/379 |
| 2,202,495 | 5/1940 | Junzi | 122/379 |
| 2,322,102 | 6/1943 | Gschwind | 122/451 R |
| 2,602,644 | 7/1952 | Sandstrom | 165/84 |
| 2,644,745 | 7/1953 | Hemminger . | |
| 2,665,119 | 1/1954 | Broman | 165/95 |
| 2,797,669 | 7/1957 | Nalven | 122/392 |
| 2,809,018 | 10/1957 | Broman | 122/395 |
| 2,904,017 | 9/1959 | Anderson et al. | 122/451 R |
| 2,949,282 | 8/1960 | Kirkby | 122/379 |
| 2,993,681 | 7/1961 | McColl | 165/95 |
| 3,257,993 | 6/1966 | Kochey | 122/392 |
| 3,267,912 | 8/1966 | Laubli | 122/451 R |
| 3,701,341 | 10/1972 | Willis | 122/392 |
| 3,774,396 | 11/1973 | Borsi et al. | 122/451 R |
| 4,032,748 | 6/1977 | Vischer et al. | 165/84 |

(List continued on next page.)

FOREIGN PATENT DOCUMENTS

| 0314929 | 5/1989 | European Pat. Off. . | |
|---|---|---|---|
| 3310200 | 9/1983 | Germany . | |
| 3219190 | 11/1983 | Germany . | |
| 61-221294 | 10/1986 | Japan | 48/77 |
| 887880 | 4/1960 | United Kingdom | 165/84 |
| 2232682 | 12/1990 | United Kingdom . | |

*Primary Examiner*—Timothy McMahon
*Attorney, Agent, or Firm*—Antonelli, Terry, Stout & Kraus, LLP.

[57] ABSTRACT

In fuel gasification, particles of, for example, coal and an oxidant are supplied to a reactor, where the coal particles are gasified. The gas thus produced may contain molten slag entrained therein and such slag could subsequently solidify and affect other components of the coal gasification apparatus. Therefore a molten slag cooling heat exchanger is positioned directly above the reactor and this cools the gas so as to cause any molten slag therein to solidify. Hence, such molten slag does not reach an evaporator above the molten slag cooling heat exchanger, so that the efficiency of the evaporator will be maintained. However, solidified molten slag may build up on heat exchange tubes of the molten slag cooling heat exchanger. Therefore, the rate of coolant supplied to the molten slag cooling heat exchanger is varied, to cause expansion and contraction which causes solidified slag to be dislodged. Hence the efficiency of the molten slag cooling heat exchanger does not deteriorate. Cleaning gas and coal particles may be jetted onto the evaporator to dislodge ash or soot therefrom.

8 Claims, 4 Drawing Sheets

U.S. PATENT DOCUMENTS

| | | | |
|---|---|---|---|
| 4,333,742 | 6/1982 | Tanca | 122/390 |
| 4,377,394 | 3/1983 | Muenger et al. | |
| 4,569,680 | 2/1986 | Darling et al. | 122/7 R |
| 4,602,677 | 7/1986 | Forster et al. | 122/392 |
| 4,738,224 | 4/1988 | Buckner et al. | 122/7 R |
| 4,920,926 | 5/1990 | Linke et al. | 122/379 |
| 4,988,367 | 1/1991 | Eckstein | 48/203 |
| 5,230,717 | 7/1993 | Ogawa et al. | 122/7 R |

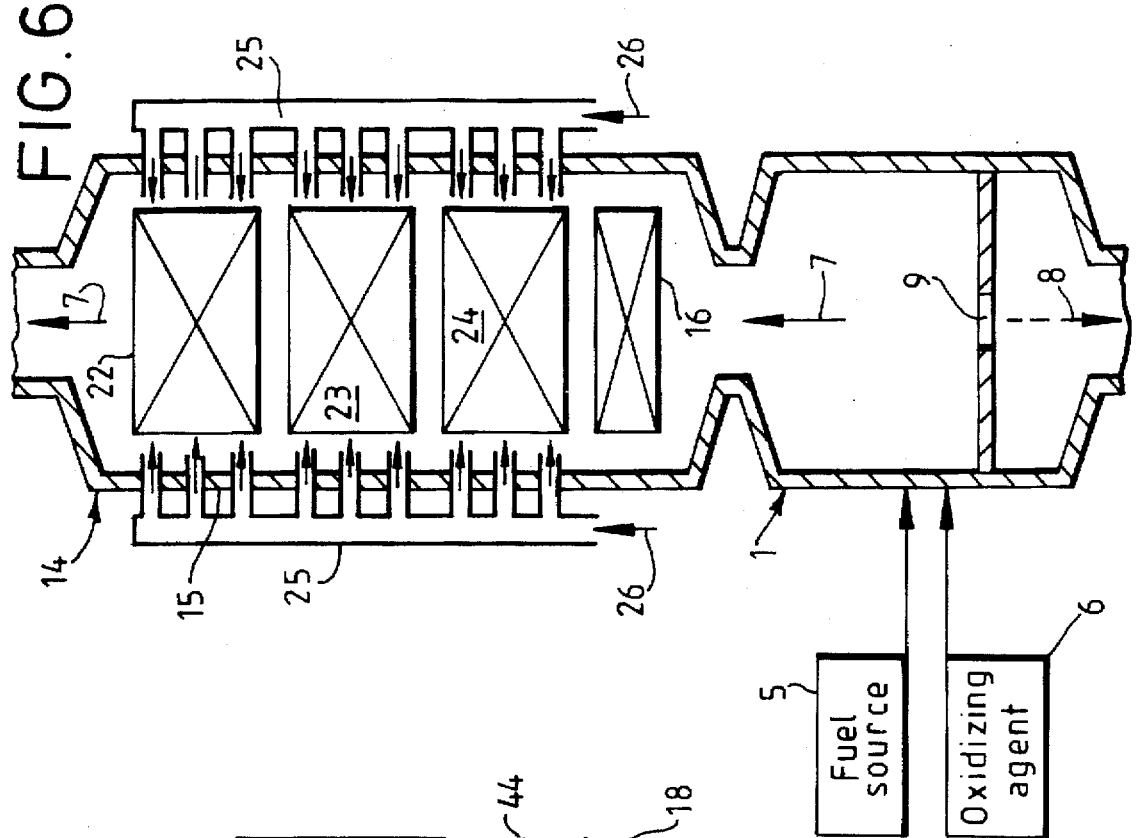
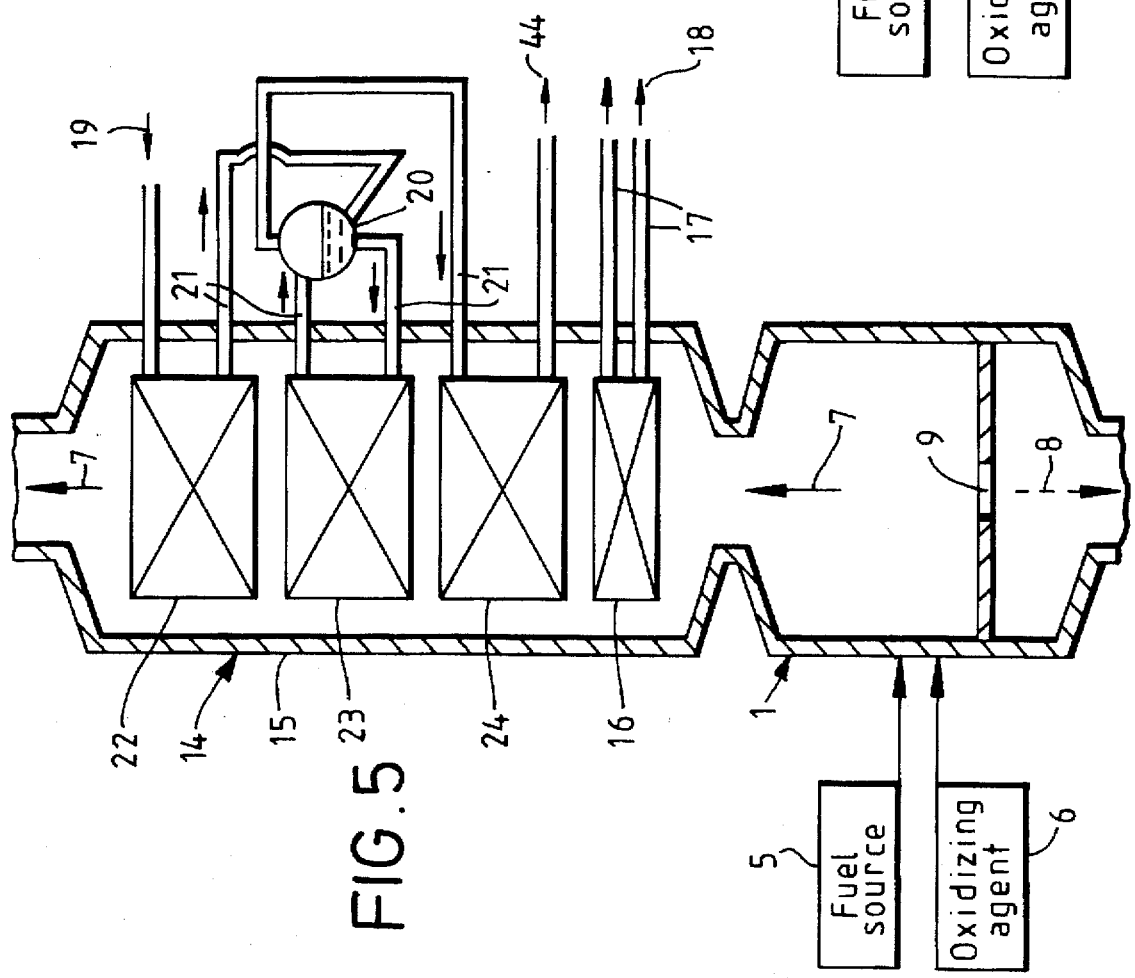

METHOD OF FUEL GASIFICATION AND AN APPARATUS FOR PERFORMING SUCH A METHOD

This application is a Continuation of application Ser. No. 08/313,842, filed Sep. 28, 1994 now abandoned.

BACKGROUND OF THE INVENTION

FIELD OF THE INVENTION

The present invention relates to a method of fuel gasification, in which fuel, such as particles of coal, are gasified in a reactor. The present invention also relates to a fuel gasification apparatus for carrying out such a method.

SUMMARY OF THE PRIOR ART

In known fuel gasification arrangements, coal is pulverized to form particles, and is fed to a reactor, together with an oxidizing agent such as air or oxygen. The coal is gasified in the reactor and produces a high temperature gas. Solid slag produced from the coal falls to the bottom of the reactor, and may be removed therefrom. The gas produced from the coal gasification flows upwardly out of the reactor, and is caused to pass over at least one, normally a plurality, of heat exchangers which remove the heat therefrom.

Examples of such coal gasification arrangements are disclosed in, for example, JP-A-61-218962, JP-A-61-221293, JP-A-61-241394, and JP-A-61-250094. In JP-A-61-218962 and JP-A-61-241394, the heat exchangers are positioned in a column located above the reactor, so that the gas passes directly from the reactor to the heat exchangers. In JP-A-61-221293 and JP-A-61-250094, the heat exchangers are located in a separate column, with the gas passing to the top of that column and moving downwardly therein.

SUMMARY OF THE PRESENT INVENTION

In the known fuel gasification arrangements discussed above, the gasification of the coal particles results in the formation of slap. If the slag is solid, it will fall to the bottom of the reactor as previously described. However, it has been found that some of the slag is in liquid or even vapor form, and such slag (hereinafter referred to as "molten" slap) is entrained in the flow of the gas from the reactor, and is thus carried towards the heat exchangers. At the heat exchangers, the exchange of heat from the gas to the coolant of the heat exchanger causes the temperature of the molten slag to fall, and this may result in the molten slap solidifying. The effect of this is that molten slap may be deposited on the heat exchangers. Such depositing of solidified slag is undesirable, because it reduces the efficiency of the heat exchangers.

Therefore, the present invention proposes that the supply of coolant to at least one of the heat exchangers be varied. This varies the temperature of the at least one heat exchanger.

The effect of such temperature variation is to cause expansion and contraction of the heat exchanger, as its temperature changes, and this dislodges the solidified slag from the heat exchanger. Thus, the efficiency of the heat exchangers is not impaired.

Preferably, the rate of supply of coolant to the at least one heat exchanger is varied cyclically, for example between upper and lower values. Such a square-wave variation is better than e.g. a sinusoidal variation, since the expansion and contraction of the heat exchanger is thus more abrupt, thereby increasing the likelihood of the solidified slag being dislodged therefrom.

It is preferable that the at least one heat exchanger is located vertically above the reactor, so that the solidified slag which is dislodged from the at least one heat exchanger falls to the reactor, and it can be removed from the same outlet as solid slag created during the gasification process itself. If the at least one heat exchanger is in a separate column, as in JP-A-61-221293 and JP-A-61-250094 as discussed above, then a separate slag removal system must be provided.

It is not necessary for all the heat exchangers to have a variable supply of coolant. It is preferable that the heat exchanger which is closest to the reactor, in the direction of gas flow, has a variable supply of coolant, since that is the heat exchanger on which molten slag is most likely to solidify. However, subsequent heat exchangers in a column of heat exchangers do not need to have a variable supply of coolant, and indeed it is preferable that they do not. Since the purpose of the coal gasification system is to generate heat by transfer of heat from the gas from the reactor to coolant in a heat exchanger, it is preferable that the majority of the heat exchangers have a steady supply of coolant, so that the heat energy that can be extracted therefrom is substantially constant. In this way, the heat exchanger can be used as part of e.g. a power generation system without difficulty.

Therefore, the present invention further proposes that the supply of coolant to one of the heat exchangers (e.g. that which is nearest the reactor) is independent of the supply of coolant to other heat exchangers. In that way, the supply of coolant, and the extraction of heat, from those other heat exchangers may be maintained constant even if the at least one heat exchanger has a varying supply of coolant. This then represents a second, independent, aspect of the present invention, although the second aspect may be used in combination with the first aspect.

In addition to molten slag, ash may be produced during the gasification of the coal particles, and that ash is carried by the gas flow to the heat exchangers. As the gas cools, the ash tends to be released from the gas flow, and thus falls onto the heat exchangers. A deposit of ash may then build up on the heat exchangers, again reducing their performance. Therefore, in order to remove that ash, it is possible to blow air onto the heat exchangers to remove the ash therefrom.

A third aspect of the present invention, however, proposes that coal particles be caused to impact with the heat exchangers, to knock the ash therefrom. The coal particles may then fall to the reactor, and contribute to the gasification process. Such supply of coal particles represents a third aspect of the present invention, which is independent but which may be used in combination with the first and/or second aspects.

Although described above in relation to the operation of fuel gasification, it should be noted that the present invention relates to both method and apparatus aspects of fuel gasification. Although the present invention has been developed for coal gasification, the present invention may be applied to the gasification of other fuels.

BRIEF DESCRIPTION OF THE DRAWINGS

Embodiments of the present invention will now be described in detail, by way of example, with reference to the accompanying drawings, in which:

FIG. 5 is a vertical cross-sectional view through a third embodiment of the present invention;

FIG. 6 is a vertical cross-sectional view through a fourth embodiment of the present invention.

DETAILED DESCRIPTION

Figure 1:
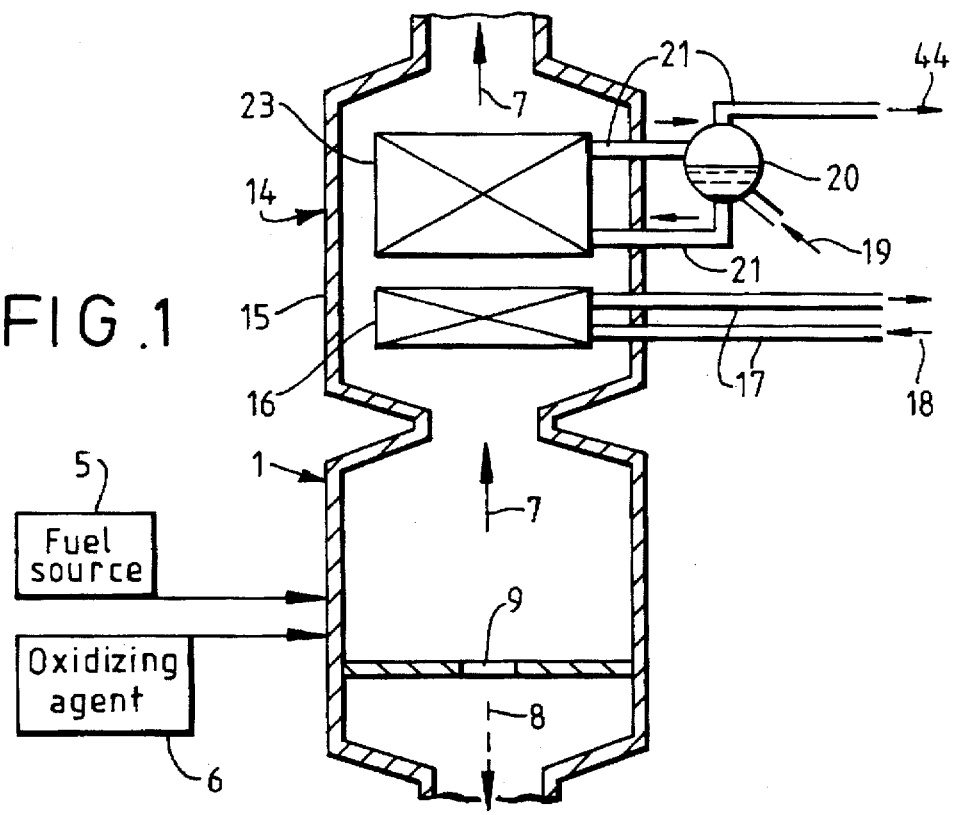
FIG. 1 is a vertical cross-sectional view through a first embodiment of the present invention.

FIG. 1 is a vertical cross-sectional view through a first embodiment of the present invention. In the first embodiment, a heat exchanger in the form of a heat recovery boiler 14 is connected to a coal gasifier 1.

Pulverized coal 5 pulverized by a mill and oxidizing agent 6 are supplied to the reactor being a coal gasifier 1 to produce gasified gas 7 at a high temperature. Solid molten slag 8 contained in the gasified gas 7 is removed through a slag tap 9 at the bottom of the coal gasifier 1.

The heat recovery boiler 14 has a heat exchanger housing 15 to guide the gasified gas 7 upward. A molten slag cooling heat exchanger 16 for cooling molten slag entrained in the gasified gas 7, which causes the molten slag to solidify and drop, is provided immediately up-stream of the coal gasifier 1, in the director of flow of the gasified gas 7 inside the heat exchanger housing 15, i.e. immediately adjacent the exit of gasified gas from the coal gasifier 1.

Above the molten slag cooling heat exchanger 16 in the heat recovery boiler 14 is an evaporator 23 connected to a drum 20. As shown in FIG. 1, the drum 20 is located outside the heat recovery boiler housing 15.

The molten slag cooling heat exchanger 16 is connected to a coolant supply means (not shown in FIG. 1) through a pipe 17. The coolant supply means supplies coolant 18 to the molten slag cooling heat exchanger 16 with an intermittently changing flow rate of coolant as will be described in more detail later. Water, cooling liquid or cooling air may be used as the coolant.

The evaporator 23 is located above the molten slag cooling heat exchanger 16 inside the heat recovery boiler housing 15 to cross the upward flow of the gasified gas 7. The evaporator 23 is connected to the drum 20 through a pipe 21. The drum 20 receives boiler feed water 19. The system for the boiler feed water 19 is a completely independent system from the system for the coolant 18.

Figure 2:
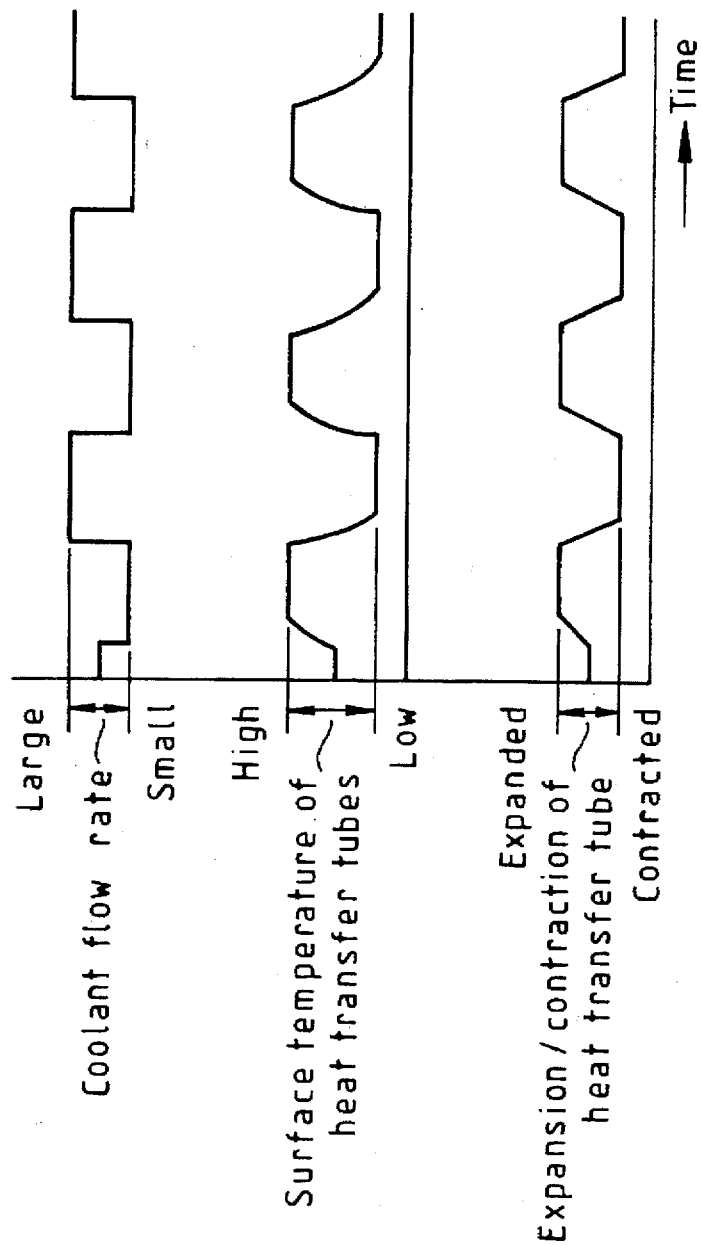
FIG. 2 shows graphs of the variation in coolant, surface temperature, and expansion/contraction in a heat exchanger in the embodiment of FIG. 1.

In the first embodiment, the coolant 18 is supplied to the molten slag cooling heat exchanger 16 from the coolant supply means through the pipe 17. The flow rate of the coolant 18 changes intermittently as shown in FIG. 2. As the result, the surface temperature of the heat transfer tubes of the molten slag cooling heat exchanger 16 reduces when the flow rate of the coolant 18 increases, and increases when the flow rate of the coolant decreases. Similarly, the heat transfer tubes contract when the flow rate of the coolant 18 is increased, and expand when the flow rate of the coolant is decreased. With changes in the surface temperature of the heat transfer tubes in the molten slag cooling heat exchanger 16 and with expansion and contraction of the heat transfer tubes themselves, objects stuck on the molten slag cooling heat exchanger 16 are removed and drop therefrom. In particular, any molten slag which adheres to the molten slag to the heat exchanger 16 when it solidifies will be dislodged from the molten slag cooling heat exchanger 16 due to the cyclical expansion and contraction of heat transfer tubes of the molten slag heat exchanger 16, as illustrated in FIG. 2. Therefore, solidified slag does not build up on the heat exchange tubes of the molten slag cooling heat exchanger 16, so that its efficiency is not impaired. If molten slag were to build up on the heat exchange tubes of the molten slag cooling heat exchanger 16, there would then be a risk that the reduction in efficiency of the molten slag cooling heat exchanger 16 would result in some molten slag not being solidified by the molten slag cooling heat exchanger 16, and it would then pass to the evaporator 23, thereby reducing the efficiency of that evaporator. By providing the cyclical variation of coolant to the molten slag cooling heat exchanger 16, this problem is prevented, or at least significantly reduced.

It can be seen that, from FIG. 2, the variation in coolant flow rate changes from a large value to a small value with a square-wave form. There is thus an abrupt change in the coolant flow rate, and this maximizes the variation in the expansion and contraction of the heat transfer to the molten slag cooling heat exchanger 16, and this maximizes the likelihood that solidified slag will be removed.

As shown in FIG. 1, the boiler feed water 19 firstly enters into the drum 20, entering into the evaporator 23 through pipe 21, and then is evaporated to generate steam. The steam is flowed out from the heat recovery boiler 14 through the drum 20.

In the first embodiment, since the gasified gas 7 having passed through the melting slag cooling heat exchanger 16 does not contain molten slag, the evaporator 23, that is the heat transfer tubes of the heat recovery boiler 14, do not get slag stuck thereto. As a result, deterioration of the heat transfer performance by sticking of the molten slag to the evaporator 23 can be prevented. Since the evaporator 23 is arranged such as to cross the up-flowing stream of the gasified gas 7, the particles such as ash contained in the gasified gas 7 are actively collided with or contact the lower surfaces of the evaporator 23, so that ash is not accumulated thereon. Therefore, the heat transfer coefficient of the outside the heat transfer tubes of the evaporator 23 can be improved by heat transfer effect contacting the evaporator 23 with the particles such as char and the improving effect of the convective heat transfer coefficient by disturbing of the temperature boundary layer by particles such as ash.

Although not shown in FIG. 1, the molten slag cooling heat exchanger 16 and the evaporator 23 will comprise a plurality of heat transfer tubes as is conventional in heat exchangers. The heat transfer tubes are arranged to cross the upward flow of the gasified gas 7 at right-angles, or at an oblique angle relative to the direction of flow of the gasified gas 7, to maximize the heat transfer effect.

Figure 3:
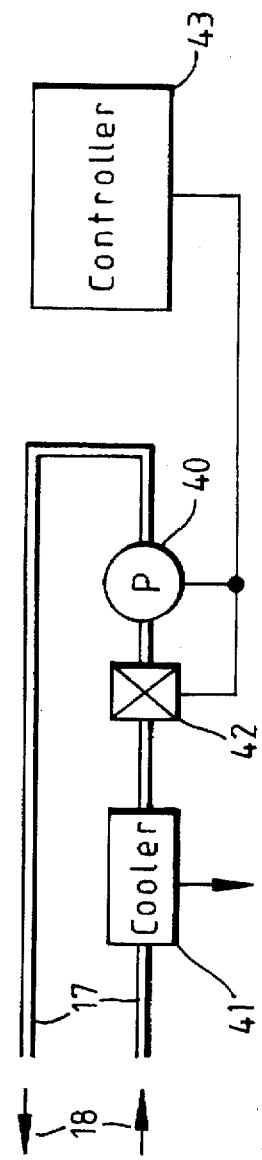
FIG. 3 shows an arrangement for supplying coolant to a heat exchanger in the embodiment of FIG. 1.

FIG. 3 shows the coolant supply means for the molten slag cooling heat exchanger 16. The coolant is driven around a looped path from the molten slag cooling heat exchanger 16 by a pump 40. The coolant 18 from the molten slag cooling heat exchanger 16 passes to a cooler 41, which removes the heat from the coolant 18, and the coolant 18 then passes via a throttle valve 42 and the pump 40 back to the molten slag cooling heat exchanger 16. The cooler 41 should preferably operate so that the heat removed from the coolant 18 thereby is substantially equal to the heat extracted from the gasified gas 7 by the molten slag cooling heat exchanger 16, and hence the coolant 18 remains at substantially constant temperature.

As is shown in FIG. 3, the pump 40 and the throttle valve 42 are connected to a controller 43 which causes the coolant flow rate to change cyclically, as illustrated in FIG. 2. Such cyclical variation in coolant flow rate may be achieved by varying the speed of rotation of the pump 40, or by controlling the opening and closing the throttle valve 42.

The arrangement for supplying boiler feed water 19 to the drum 20, and the removal of heat from evaporated water 44 which passes from the pipe 21 is not described in detail, and may be conventional. For example, the evaporated water 44 may be used to feed a boiler of a turbine, or may be used to generate power or heat, by extracting heat therefrom by passing the evaporated water 44 through a condenser.

It should be noted that although the embodiment of FIG. 1 makes use of a heat recovery boiler 14, having an evaporator 23, other arrangements are possible. For example, the embodiment of FIG. 1 may be modified by use of a different form of heat exchanger, instead of the heat recovery boiler 14. For example, a closed-loop heat exchanger may be used in which heat is extracted from a flow of coolant flowing through a heat exchanger corresponding generally to the molten slag cooling heat exchanger 16, in a similar way to that shown in FIG. 3. In such an arrangement, however, it is not necessary that the flow of coolant is controlled to have a cyclical variation therein, and indeed a constant flow rate is preferable so that heat extracted from a cooler in the looped flow path of the coolant will be substantially constant.

Figure 4:
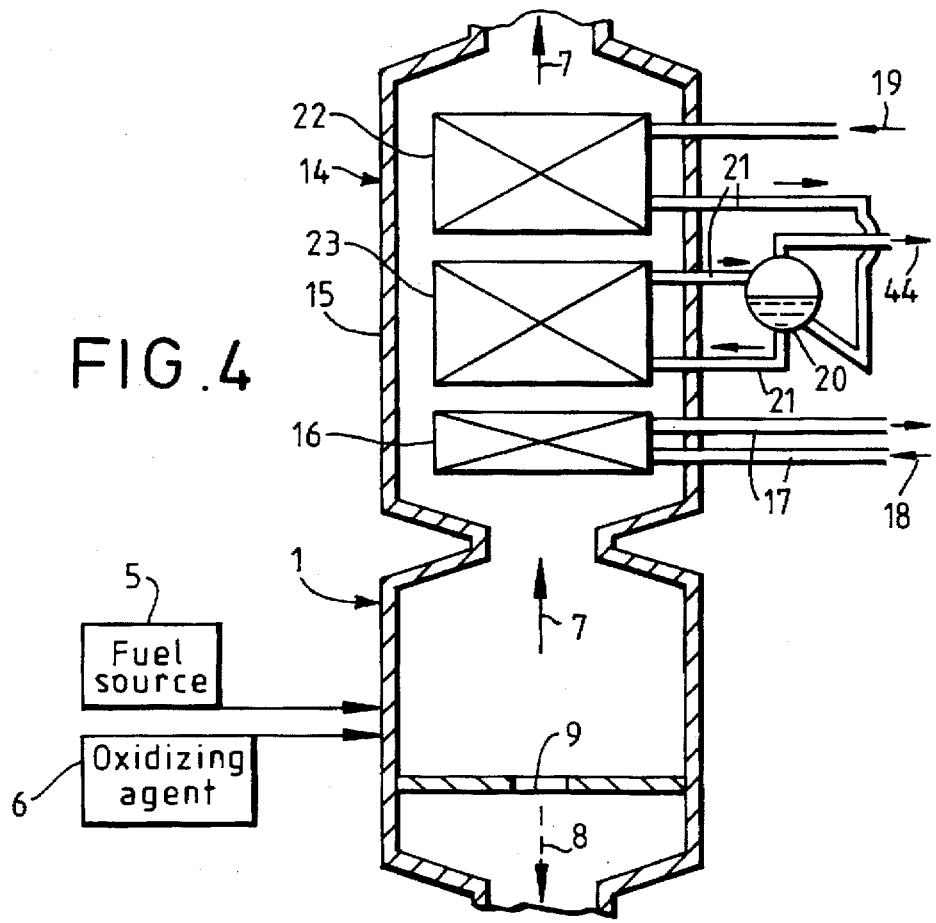
FIG. 4 is a vertical cross-sectional view through a second embodiment of the present invention.

FIG. 4 is a vertical cross-sectional view showing a second embodiment in accordance with the present invention. Parts of the second embodiment which correspond to parts of the first embodiment are indicated by the same reference numerals. However, in the second embodiment, the heat recovery boiler 14 has a pre-heater 22 in addition to the evaporator 23.

As in the first embodiment, the evaporator 23 is directly above the melting slag cooling heat exchanger 16 inside the heat recovery boiler housing 15, and the pre-heater 22 is then directly above the evaporator 23. The evaporator 23 and the pre-heater 22 are arranged such that their heat exchange tubes cross the up-flowing stream of the gasified gas 7, and are connected to the drum 20 through the pipe 21.

In the second embodiment, the boiler feed water 19 firstly enters the pre-heater 22 to be heated, then into the drum 20, from where it passes to the evaporator 23 to be evaporated to generate steam. The steam flows out of the heat recovery boiler 14 through the drum 20.

The effects of the second embodiment are the same as those of the first embodiment except that the amount of the heat recovered is larger.

FIG. 5 is a vertical cross-sectional view showing a third embodiment of the present invention. This third embodiment is generally similar to the first and second embodiments, and the same reference numerals are used to indicate corresponding parts. However, in the third embodiment, the heat recovery boiler 14 comprises a pre-heater 22, an evaporator 23 and a super-heater 24 placed in a multi-stage arrangement inside the heat recovery boiler housing 15.

The super-heater 24 is directly above the melting slag cooling heat exchanger 16 inside the heat recovery boiler housing 15, the evaporator 23 is directly above the super-heater 23, and the pre-heater 22 is directly above the evaporator 23. The super-heater 24, the evaporator 23 and the pre-heater 22 are arranged such that their heat exchanger tubes cross the up-flowing stream of the gasified gas 7, and are connected to the drum 20 through the pipe 21.

In the third embodiment, the boiler feed water 19 first enters the pre-heater 22 to be heated, and then passes to the drum 20. From the drum 20, the boiler fee water passes to the evaporator 23 to be evaporated to generate steam. The steam enters the drum 20, and is transferred to the super-heater 24 before it flows out from the heat recovery boiler 14.

Thee effects of the third embodiment are the same as those of the second embodiment except that the amount of the heat recovered is larger.

FIG. 6 is a vertical cross-sectional view showing a fourth embodiment of the present invention. The fourth embodiment of FIG. 6 is generally similar to the third embodiment of FIG. 5, and the same reference numerals are used to indicate the corresponding parts. However, for clarity, the pipes 17 and 21, and the drum 20 are not shown.

As has previously been mentioned, the pre-heater 22, the evaporator 23 and the super-heater 24 have heat transfer pipes which cross the up-flowing stream of the gasified gas 7. If soot or ash is entrained in the gasified gas 7, it is likely to be released as the gasified gas 7 is cooled in its upward flow through the heat recovery boiler 14. The soot or ash then falls onto the pre-heater 22, the evaporator 23 and/or the super-heater 24, tending to rest on the upper surfaces thereof.

Therefore, the fourth embodiment, soot blowing apparatuses 25 are arranged in peripherally spaced relationship around the heat recovery boiler housing 15 of the heat recovery boiler 14. The soot blowing apparatuses 25 blow soot cleaning gas 26 against the upper surfaces of the heat transfer tubes of the pre-exchanger 22, the evaporator 23 and the super-heater 24. Purified gas derived from the gasified gas 7 or nitrogen gas may be used as the soot cleaning gas 26.

As described above, by using the soot blowing apparatuses 25, the soot cleaning gas 26 actively removes any soot or ash which has accumulated on the upper surfaces of the heat transfer tubes. Thus, any decrease in the amount of heat recovered from the gasified gas 7 due to the accumulation of soot or ash on the heat transfer tubes can be prevented. Any large lumps of ash removed from the heat transfer tubes drop into the coal gasifier 1 to be gasified or to be removed via the slag tap 9.

The soot blowing apparatuses 25 shown in the fourth embodiment may be used in the first, second and third embodiments.

Figure 7:
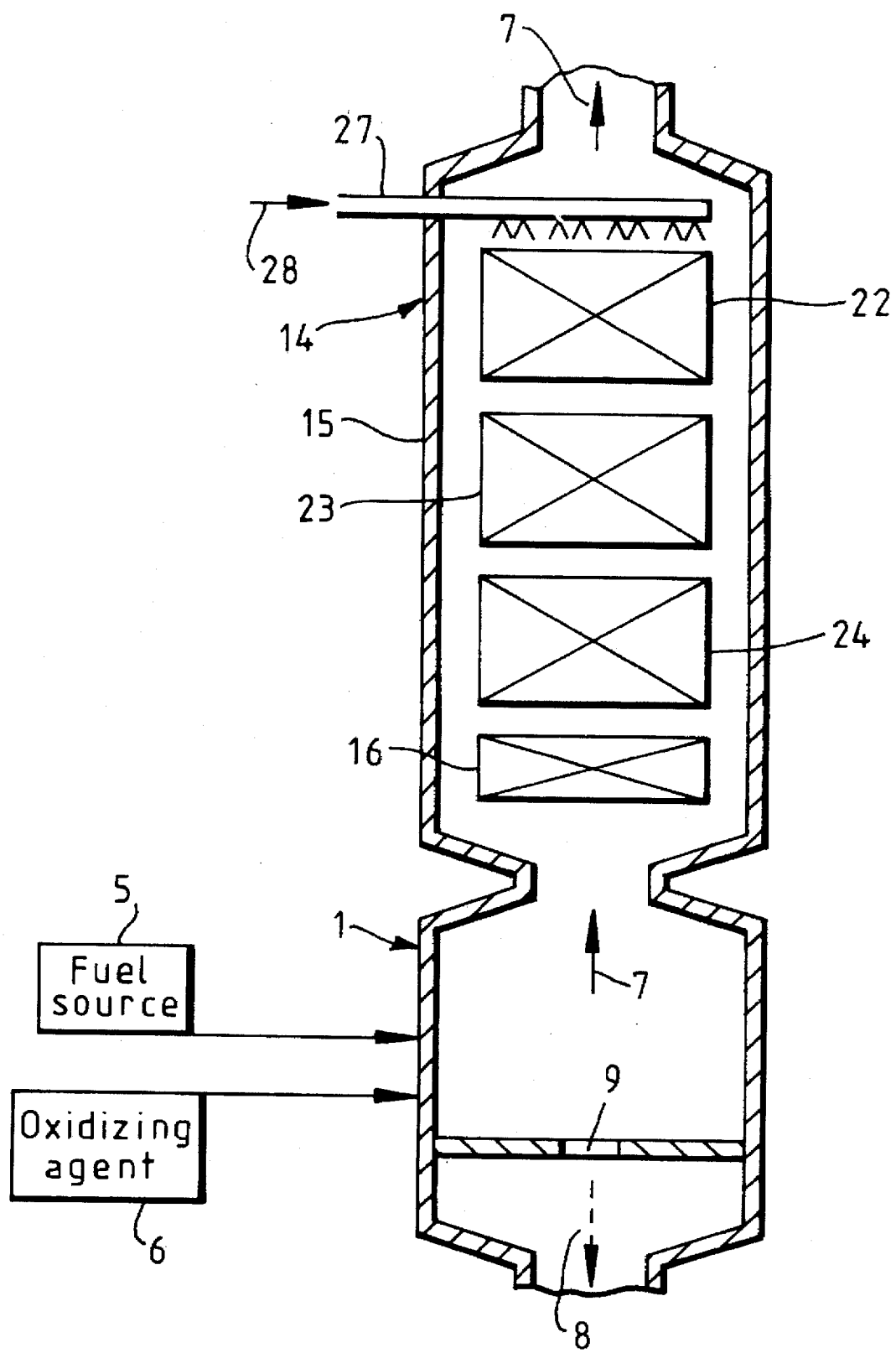
FIG. 7 is a vertical cross-sectional view through a fifth embodiment of the present invention.

FIG. 7 is a vertical cross-sectional view showing a fifth embodiment of the present invention. This fifth embodiment is generally similar to the third embodiment of FIG. 5, and the same reference numerals are used to indicate corresponding parts. As in the fourth embodiment of FIG. 6, the pipes 17 and 21, and the drum 20 are not shown for the sake of clarity.

As in the fourth embodiment, the fifth embodiment seeks to remove soot or ash which collects on the heat transfer tubes of the pre-heater 22, the evaporator 23, and/or the super-heater 24.

In the fifth embodiment, a coal particle jetting apparatus 27 is installed in a heat recovery boiler housing 15 of the heat recovery boiler 14. The coal particle jetting apparatus 27 causes coal particles 28 to be jetted therefrom so that they impact with the upper surfaces of the heat transfer tubes arranged inside the heat recovery boiler housing 15 to remove the ash accumulated on the upper surfaces of those heat transfer tubes. The coal particles 28 which are used by the coal particle jetting apparatus 27 may be produced from the same coal pulverizing mill as those to produce the coal particles 5 which are fed to the coal gasifier 1. If this is done, the coal particles used by the coal particle Jetting apparatus 27 will be those coal particles with relatively large diameters.

In the fifth embodiment, by using the coal particle jetting apparatus 27, the coal particles 28 which are jetted to impact with the upper surfaces of the heat transfer tubes actively remove the ash accumulated on the upper surfaces of the heat transfer tubes. Thus, any decrease in the amount of heat recovered from the gasified gas 7 due to the accumulation of the ash on the heat transfer tubes 13 can be prevented.

Although in FIG. 5 the coal particle jetting apparatus 27 is located above the pre-heater 22, similar coal particle jetting apparatuses may be provided above the evaporator 23 and the super-heater 24. Furthermore, the coal particle jetting apparatus 27 may be used in the first, second or third embodiments.

Thus, with the present invention, molten slag is solidified by a molten slag cooling heat exchanger 16, to prevent the molten slag passing to the subsequent heat exchangers, which could reduce their efficiency. Hence, heat extraction from the gasified gas 7 by the evaporator 23 or other heat exchanger may be maintained at constant efficiency. To prevent solidified molten slag affecting the performance of the molten slag cooling heat exchanger 16, which could result in molten slag reaching the evaporator 23, the flow of coolant to the molten slag cooling heat exchanger 16 is varied, thereby to cause expansion and contraction of the molten slag cooling heat exchanger 16, and in particular the heat exchange tube thereof, so as to dislodge any molten slag which has solidified thereon, thereby ensuring that the molten slag cooling heat exchanger 16 operates with constant efficiency. The solidified slag released from the molten slag cooling heat exchanger 16 falls to the slag tap 9, so that it can be removed from the coal gasifier 1 in the same way as solid slag 8 produced during the gasification of the pulverized coal 5.

Many variations of the above embodiments are possible. It has already been mentioned above that other forms of heat exchangers may be used, instead of the evaporator 23, and the manner of heat removal from the coolant of any such heat exchanger may be chosen in dependence on the purpose thereof. The present invention may therefore be used in boilers, turbines, or for other heating purposes. Moreover, it would be possible for the heat exchangers, including the molten slag cooling heat exchanger 16, to be in a separate column, as in known arrangements mentioned previously. However, this would then have the disadvantage that molten slag could condense on the passageways to such a separate column, which could be disadvantageous. Therefore, as in the embodiments described above, it is preferable that the molten slag cooling heat exchanger 16 is directly above the coal gasifier 1. The other heat exchangers, such as the evaporator 23 could be in a separate column if desired.

What is claimed is:

1. A method of fuel gasification comprising:

supplying fuel particles to a reactor;

gasifying said fuel particles in said reactor to form a gas;

causing said gas to interact with a plurality of heat exchangers to maintain said plurality of heat exchangers at a temperature less than the temperature of said gas, thereby to cool said gas by heat exchange from said gas to said plurality of heat exchangers;

wherein at least one of said plurality of heat exchangers closest to said reactor in a gas flow direction is supplied with coolant independently of at least one other of said plurality of heat exchangers furthest from said reactor in the gas flow direction;

wherein the rate of supply of said coolant to said at least one heat exchanger is varied cyclically, thereby to vary said temperature of said at least one heat exchanger to cause expansion and contraction of said at least one heat exchanger, thereby to remove slag therefrom, and wherein the slag removed from said heat exchanger is allowed to fall into said reactor.

2. A method according to claim 1, wherein said rate of supply of coolant has first and second values, and said rate of supply is varied by supplying said coolant at said first value for a first predetermined time and at said second value for a second predetermined time.

3. A method according to claim 1, wherein said gas is caused to flow through at least one further heat exchanger after flowing through said at least one heat exchanger.

4. A method according to claim 3, wherein cleaning gas is blown onto said at least one further heat exchanger, thereby to remove soot therefrom.

5. A method according to claim 3, wherein particles are caused to impact with said at least one further heat exchanger, thereby to remove soot therefrom.

6. A method of fuel gasification comprising:

supplying fuel particles to a reactor;

gasifying said fuel particles in said reactor to form a gas;

causing said gas to flow through plurality of heat exchangers to maintain said plurality of heat exchangers at a temperature less than the temperature of said gas, thereby to cool said gas by heat exchange from said gas to said plurality of heat exchangers;

wherein at least one of said plurality of heat exchangers closest to said reactor in a gas flow direction is supplied with coolant independently of at least one other of said plurality of heat exchangers furthest from said reactor in the gas flow direction;

wherein the rate of supply of said coolant to said at least one heat exchanger is controlled cyclically so as to cause variable expansion and contraction of said at least one heat exchanger to remove slag therefrom, and wherein the slag removed from said heat exchanger is allowed to fall into said reactor.

7. A method of fuel gasification comprising:

supplying fuel to a reactor;

gasifying said fuel in said reactor to form a gas;

causing said gas to flow through a plurality of heat exchangers, each of said plurality of heat exchangers being supplied with coolant to maintain said plurality of heat exchangers at temperatures less than the temperature of said gas, thereby to cool said gas by heat exchange from said gas to said plurality of heat exchangers;

wherein the supply of coolant to a first one of said plurality of heat exchangers closest to said reactor in a gas flow direction is independent of the supply of coolant to others of said plurality of heat exchangers and is varied cyclically to remove slag therefrom, and wherein slag removed from said first one of said plurality of heat exchangers is allowed to fall into said reactor.

8. A method according to claim 7, wherein said supply of coolant to said others of said plurality of heat exchangers is constant.

* * * * *